Dec. 8, 1931. W. M. WHITE 1,834,988
VALVE
Filed Sept. 27, 1926
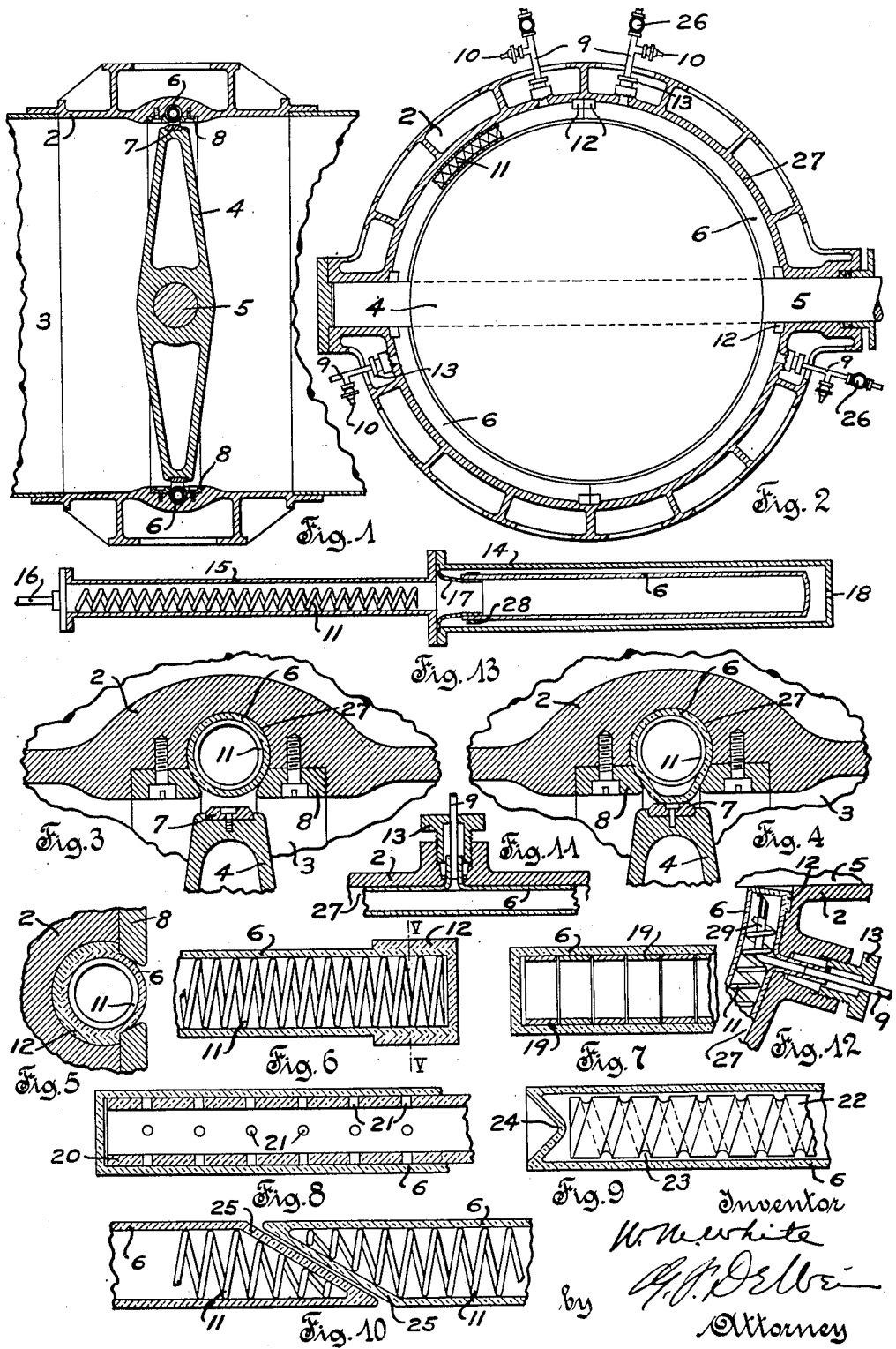

Patented Dec. 8, 1931

1,834,988

UNITED STATES PATENT OFFICE

WILLIAM M. WHITE, OF MILWAUKEE, WISCONSIN

VALVE

Application filed September 27, 1926. Serial No. 137,915.

This invention relates in general to new and useful improvements in the construction and operation of valves.

An object of the invention is to provide simple and efficient means for sealing valves of any kind, but especially valves of the butterfly type embodying either circular or rectangular disks, against leakage, when the valves are in closed position. Another object of the invention is to provide an improved valve seating which may be expanded to insure tight closing of the valve with which it is associated. A further object of the invention is to provide means for effectively maintaining valve seatings in place, to prevent chattering and tendency toward distortion of valve seatings into the passage between the valve and its casing, and to effect convenient assemblage and dismantling of valve seatings. Still another object of the invention is to provide an improved rubber packing for valves or the like, and means for facilitating the manufacture of such packings. These and other objects and advantages will be apparent from the following description.

A clear conception of several embodiments of the invention and of the manner of constructing and operating devices constructed in accordance therewith, may be had by referring to the drawings accompanying and forming a part of this specification in which like reference characters designate the same or similar parts in the various views.

Fig. 1 is a central section through a butterfly valve and its casing, having one form of the improved sealing appliance applied thereto.

Fig. 2 is a transverse section through the valve casing of the valve structure shown in Fig. 1, the section being taken in the plane of the valve and the valve disk being shown in elevation.

Fig. 3 is an enlarged fragmentary sectional view through a butterfly valve and its casing showing the valve in closed position but prior to final sealing thereof.

Fig. 4 is a view similar to that of Fig. 3, showing the valve finally sealed or packed while in closed position.

Fig. 5 is an enlarged fragmentary section taken transversely through one of the segmental valve sealing tubes and the adjacent retaining structure, the section being taken along the line V—V of Fig. 6.

Fig. 6 is an enlarged fragmentary sectional view taken longitudinally through the end of one of the segmental sealing tubes.

Fig. 7 is an enlarged fragmentary sectional view through the end of one of the segmental sealing tubes, showing a modified form of means for preventing inward distortion of the tube.

Fig. 8 is a sectional view similar to that of Fig. 7, through one of the segmental sealing tubes, showing still another form of means for preventing inward distortion of the tube.

Fig. 9 is an enlarged longitudinal section through the end portion of one of the segmental sealing tubes, showing a modified form of end structure and also showing another form of means for preventing inward distortion of the tube.

Fig. 10 is an enlarged fragmentary longitudinal section through the abutting ends of two adjacent sealing tubes showing a modified form of end construction and also disclosing a modified form of means for retaining the tube ends against collapse.

Fig. 11 is a fragmentary sectional view taken in the plane of closing of the valve, through the pressure admission means for inflating one of the sectional sealing tubes.

Fig. 12 is a fragmentary sectional view through the end of one of the sealing tubes and the adjacent retaining structure, showing improved means for facilitating the escape of air during the admission of liquid to the interior of the tube.

Fig. 13 is a longitudinal sectional view through apparatus for inserting the means for preventing collapse or inward distortion of the sealing tubes.

Referring to Figs. 1 and 2, the butterfly valve to which the invention has been specifically applied therein, comprises in general a hollow member or casing 2 forming a conduit 3, and a body member or disk valve 4 mounted upon a shaft 5 and oscillatable within the conduit 3 to control the flow of fluid therethrough. While the invention has been illustrated as applied to a butterfly valve and the shaft 5 has been disclosed as being horizontally disposed, it will be apparent that the invention is equally well adapted for application to valves of various types having the actuating stems vertically or otherwise disposed. As shown in Figs. 1 and 2, the valve 4 is in closed position and has peripheral seating strips 7 located in close proximity to recesses 27 in the casing 2, when the valve is in closed position. When the valve 4 is in open position, it is swung in line with the axis of the conduit 3 and fluid flowing through the casing 2 passes along the opposite faces of the valve 4 in an obvious manner. Located within the casing recesses 27 and substantially surrounding the periphery of the body member or valve 4, are segmental flexible or rubber tubes 6 which are confined within the recesses 27 by means of removable retaining strips 8 and which are retained against endwise displacement by means of enlargements or blocks 12 associated directly with the ends of the tubes 6 and coacting with local notches in the recesses 27. The segmental tubes 6 are prevented from collapsing and from subsequently dropping from the recesses 27 into the conduit 3 when the pipe line is disposed other than vertical, by means of retaining elements such as coiled wires 11, coacting with the inner surfaces of the tubes and providing spaces for the inflating fluid to act against these tube surfaces. The segmental tubes 6 are capable of being inflated to distort the same as shown in Fig. 4, by the admission of fluid under pressure through pipes 9 having control valves 26 therein, and if desired, these pipes 9 may also be provided with air escape valves 10 as shown in Fig. 2. The pressure from within the segmental tubes 6 may either be released through the pipes 9 and valves 26, or through the vent valves 10, and the pipes 9 may be clamped to nipples formed integral with the tubes 6 as shown in Fig. 11, by means of clamping blocks 13 having split and tapered inner ends coacting with similarly formed recesses in the casing 2.

In place of the coiled wire 11 shown in Figs. 2, 3, 4, 5 and 6 and constituting means for preventing inward distortion or collapse of the tubes 6, bushing sections 19 formed of any relatively hard material and specifically illustrated in Fig. 7, may be utilized to prevent such distortion. Another alternative for preventing such collapse of the tubes 6 is illustrated in Fig. 8 wherein a relatively stiff tube 20 having perforations 21 therein is utilized for this purpose. Still another alternative form of preventing collapse of the tubes 6 is shown in Fig. 9 wherein a solid element 22 having spiral external grooves 23, is utilized for the same purpose. It will be noted, however, that each of these embodiments provides for admission of the expanding fluid directly against the inner wall of the tube 6. In the embodiment of the invention illustrated in Fig. 9, the end of the tube 6 is also modified by the provision of an inwardly projecting portion 24 which is capable of being forced outwardly when pressure is applied to the interior of the tube 6 and to thereby force the tube end into firm engagement with adjacent structure. A further modification of the tube ends is illustrated in Fig. 10 wherein the ends 25 are disposed at an angle to the tube axes and cooperate to form a lap joint. In the embodiment of Fig. 10, the spiral wires 11 located within the tubes 6 have their ends formed to coact with the tube ends 25 in an obvious manner, in order to also prevent collapse of these tube ends.

When the nipple for applying and releasing pressure to and from the interior of the tube 6 is located so as to form an air pocket above the nipple, it may be desirable to utilize venting structure such as shown in Fig. 12 in order to insure the escape of air. In this construction the end 29 of the pipe 9 is formed so as to extend to the highest point within the tube 6 thereby permitting the air to escape as the liquid is admitted to the interior of the tube during inflation thereof.

In each of the embodiments of the invention illustrated it is relatively desirable to have the walls of the tubes 6 biased inwardly, that is to have these walls under tension at all times. Such inward biasing is desirable in order to eliminate chattering and also to prevent the tube from wedging toward the low pressure side of the valve 4, in the space between the edge of the valve body and the casing 2. In order to permit insertion of the element for preventing inward distortion or collapse of a tube 6, and to insure the desired bias of the tube after insertion of the element, apparatus such as shown in Fig. 13 may be utilized. The casing 14 has an air vent 18 at one end thereof and is provided with a tube support 17 at its opposite end. A second casing 15 is in open communication with the interior of the support 17 at one end, and has its opposite end in communication with a source of fluid supply through a pipe 16. A tube section 6 may be disposed within the casing 14 and clamped to the support 17 by means of a clamping ring 28, the opposite end of the tube 6 being sealed. The tube retaining element or wire 11 may be inserted within the second casing 15, whereupon fluid under pressure may be applied through the pipe 16 to inflate the tube 6 sufficiently to permit free entry of the coiled wire 11. The apparatus may then be set in vertical position so that the wire 11 may drop into the inflated tube 6 whereupon the pressure may be relieved and the wire 11 will be located within the tube 6 which is prevented from returning to normal position by virtue of the fact that the outside diameter of the wire coil is greater than the normal internal diameter of the tube 6. The retaining elements 19, 20 and 22 may obviously be inserted in a similar manner. After retaining elements have been inserted within the segmental tubes 6, the tubes may be inserted within the recesses 27 and confined therein by the application of the strips 8.

It will thus be noted that the flexible elements or rubber tubes 6 provide simple and effective means for sealing the joint between the valve 4 and the casing 2 when the valve is in closed position. Any degree of pressure desired may be applied to the interior of the tubes 6 in order to insure tight closing. Upon release of the internal pressure from within the tubes 6, these tubes assume the position shown in Fig. 3 by virtue of their inward bias and thus preventing chattering and permitting free opening of the valve 4 without danger of damaging the tubes. The retaining elements 11, 19, 20, 22 being of larger external diameter than the gap between the opposed strips 8, prevent the tubes 6 from falling out of the recesses 27 when the tubes have been deflated, and the clamping blocks 13 provide effective means for connecting the source of fluid under pressure to the tubes 6 and for preventing escape of the inflating fluid. The tubes 6 are also retained against endwise separation by the end blocks thus insuring tight packing at all portions of the valve periphery.

It should be understood that it is not desired to limit the invention to the exact details of construction and operation herein shown and described, for various modifications within the scope of the claims may occur to persons skilled in the art.

It is claimed and desired to secure by Letters Patent:

1. In combination, a casing member, a valve member cooperable with said casing member to control the flow of fluid therethrough, one of said members having a recess provided with a restricted opening facing the other member, a tubular sealing element located within said recess and expansible by fluid pressure through said opening to provide a seal between said members, and means within said element for positively confining the same within said recess when the pressure is released.

2. In combination, a casing member, a valve member cooperable with said casing member to control the flow of fluid therethrough, one of said members having a recess provided with a restricted opening facing the other member, a flexible tubular sealing element located entirely within said recess, means for expanding said element to urge a portion thereof through said opening and against said other element to provide a seal between said members, and means located entirely within said element for positively confining the same within said recess when said expanding means is inactive.

3. In combination, a casing member, a valve member cooperable with said casing member to control the flow of fluid therethrough, said casing member having a recess provided with a restricted opening facing said valve member, a tubular sealing element located within said recess and expansible by fluid pressure through said opening to provide a seal between said members, and means within said element for positively preventing displacement thereof through said opening when the pressure is released.

4. In combination, a casing member, a valve member cooperable with said casing member to control the flow of fluid therethrough, said casing member having a recess provided with a restricted opening facing said valve member, a flexible tubular sealing element located entirely within said recess, means for admitting fluid under pressure to the interior of said sealing element to expand the same through said opening and against said valve member to provide a seal between said members, and means located entirely within said element for maintaining the same in partially expanded condition to retain said element against displacement through said opening.

5. In combination, a casing member, a valve member cooperable with said casing member to control the flow of fluid therethrough, one of said members having a recess provided with a restricted opening facing the other member, a soft rubber tube biased to assume a smaller cross section and having rigid means for limiting the action of said bias, said tube being located within said recess and being normally expanded by said rigid means to a width greater than that of said opening, and means for admitting fluid under pressure to the interior of said tube to additionally expand a portion thereof through said opening and against said other member.

6. In combination, a casing member, a valve member cooperable with said casing member to control the flow of fluid therethrough, one of said members having a recess provided with a restricted opening facing the other member, a sectional tubular sealing element located within said recess and expansible through said opening to provide a seal between said members, and means forming an interlock between the ends of the sections of said element for preventing longitudinal displacement thereof within said recess.

7. In combination, a casing member, a valve member cooperable with said casing member to control the flow of fluid therethrough, said casing member having a recess provided with a restricted opening facing said valve member and also provided with local enlargements, a sectional tubular sealing element located within said recess, the sections of said element having end enlargements snugly fitting said recess enlargements to prevent endwise displacement of the sections of said element, and means for admitting fluid under pressure to the interior of said element to expand a portion thereof through said recess and against said valve member to provide a seal between said members.

8. In combination, a casing member, a valve member cooperable with said casing member to control the flow of fluid therethrough, one of said members having an annular elongated recess disposed in a substantially vertical plane, an elongated tubular sealing element located within said recess and expansible laterally against the other member to provide a seal between said members, and means for admitting liquid under pressure to the highest portion of said element and for permitting air to freely escape when the expanding liquid is admitted to said element.

9. The combination in a valve mechanism comprising a valve casing, a pivoted valve disk member adapted to cooperate therewith, tubular sealing means between said casing and valve member and being adapted to receive fluid pressure for causing expansion of said sealing means, and a core member disposed within said tube for limiting inward movement of said sealing means when pressure in said space is released.

10. The combination in a valve mechanism comprising a casing, a movable valve member, sealing means disposed between said casing and movable member when the latter is in its closed position and having a fluid chamber, and a core disposed within said chamber adapted to prevent said sealing means being collapsed by pressure within the valve mechanism upon release of pressure in said chamber, said core being removable with said sealing means.

11. The combination in a valve mechanism comprising a casing, a movable valve member, tubular sealing means disposed between said casing and movable member when the latter is in its closed position, means whereby pressure may be supplied to said tubular means to cause expansion thereof for sealing purposes, and a core disposed within said tubular sealing means and adapted to prevent collapsing thereof by pressure within the valve mechanism when the sealing pressure is released.

12. The combination in a valve mechanism comprising a casing, a valve disk member pivotally disposed therein, means for sealing said casing and valve member comprising a plurality of sections of tubular elements disposed between said casing and the periphery of said valve disk when in closed position, and core means disposed within each of said sections.

13. The combination in a valve mechanism comprising a casing, a movable valve member, an elastic tubular sealing member adapted to be expanded by fluid pressure to effect a sealing action between said casing and valve member, and a core disposed within said tubular member.

14. The combination in a valve mechanism comprising a casing, a movable valve member, a flexible tubular sealing member adapted to be expanded by fluid pressure to effect a sealing action between said casing and valve member, and a core disposed within said tubular member.

15. The combination in a valve mechanism comprising a casing, a movable valve member, a rubber tubular sealing member adapted to be expanded by fluid pressure to effect a sealing action between said casing and valve member, and a core disposed within said tubular member.

16. The combination in a valve mechanism comprising a casing, a movable valve member, a flexible tubular sealing member adapted to be expanded by fluid pressure to effect a sealing action between said casing and valve member, and a flexible core disposed within said tubular member.

In testimony whereof, the signature of the inventor is affixed hereto.

WILLIAM M. WHITE.